United States Patent
Gupta et al.

(10) Patent No.: US 7,921,423 B2
(45) Date of Patent: Apr. 5, 2011

(54) SYSTEM AND METHOD FOR SCHEDULING AND COORDINATING TASKS ACROSS APPLICATION PROCESSES USING SHARED MEMORY

(75) Inventors: Lokesh M. Gupta, San Jose, CA (US); Roger Raphael, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 11/857,890

(22) Filed: Sep. 19, 2007

(65) Prior Publication Data
US 2008/0010645 A1 Jan. 10, 2008

Related U.S. Application Data

(62) Division of application No. 10/299,232, filed on Nov. 19, 2002, now Pat. No. 7,293,270.

(51) Int. Cl.
G06F 9/46 (2006.01)
G06F 15/16 (2006.01)
G06F 12/00 (2006.01)
(52) U.S. Cl. ........ 718/102; 718/104; 719/312; 709/208; 709/214; 710/200
(58) Field of Classification Search ............... 718/102
See application file for complete search history.

(56) References Cited

U.S. PATENT DOCUMENTS

| 5,313,638 A * | 5/1994 | Ogle et al. ............ 710/200 |
| 5,428,781 A * | 6/1995 | Duault et al. .......... 718/102 |
| 5,617,570 A * | 4/1997 | Russell et al. ......... 719/312 |
| 6,212,573 B1 * | 4/2001 | Lim et al. ............. 719/315 |
| 6,629,152 B2 * | 9/2003 | Kingsbury et al. ...... 719/313 |
| 6,658,490 B1 * | 12/2003 | Williams et al. ........ 719/330 |
| 6,718,398 B1 * | 4/2004 | Dontje et al. .......... 719/312 |
| 2003/0061395 A1 * | 3/2003 | Kingsbury et al. ...... 709/312 |

OTHER PUBLICATIONS

Refer to IDS filed for U.S. Appl. No. 10/299,232.

* cited by examiner

*Primary Examiner* — Lewis A Bullock, Jr.
*Assistant Examiner* — Jennifer N To
(74) *Attorney, Agent, or Firm* — Michael J. Buchenhorner; Terry J. Carroll

(57) ABSTRACT

A system and method for scheduling and coordinating tasks between a master application and a slave application includes: receiving a request from an application program; determining whether the request includes an embedded subtask; extracting the subtask and sending the subtask to a shared memory space for retrieval by the slave application, if the request includes an embedded subtask; and waiting for a response from the slave application.

6 Claims, 10 Drawing Sheets

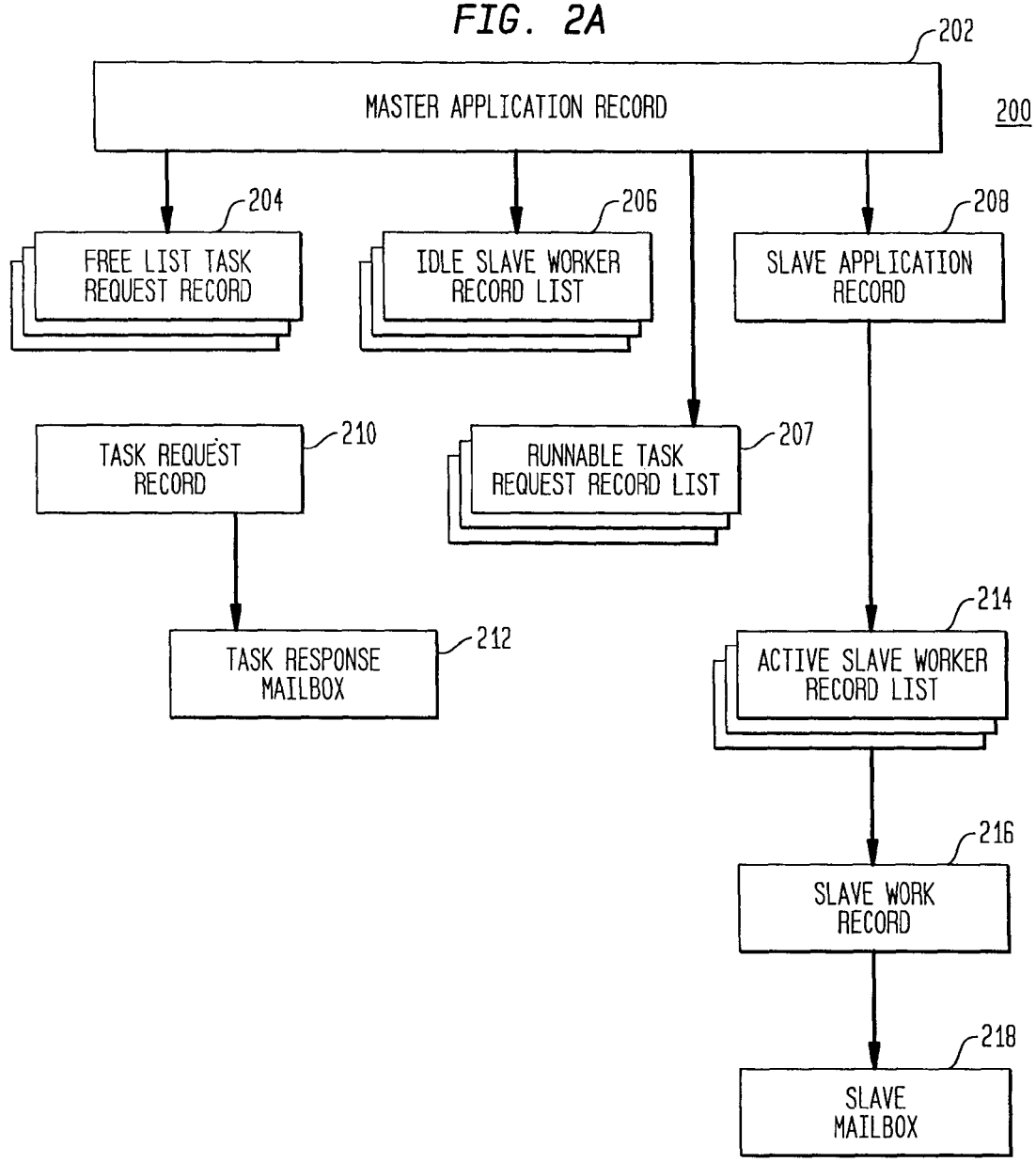
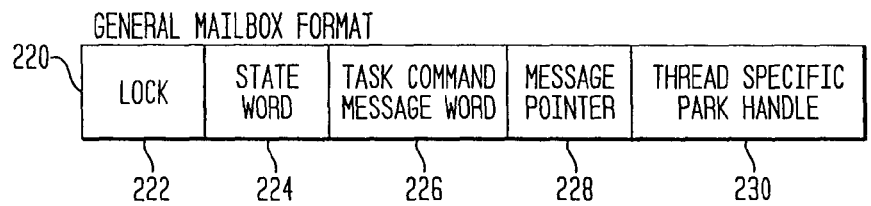

SYSTEM AND METHOD FOR SCHEDULING AND COORDINATING TASKS ACROSS APPLICATION PROCESSES USING SHARED MEMORY

CROSS-REFERENCES TO RELATED APPLICATIONS

This application is a division of commonly-owned, U.S. application Ser. No. 10/299,232, filed on Nov. 19, 2002, which is now U.S. Pat. No. 7,293,270 and incorporated by reference as if fully set forth herein.

BACKGROUND OF THE INVENTION

Computer applications are developed as a set of computer programs which may interact to share and pass information. The sets of programs may run on a single computer or a set of computers inter-connected by a computer network. Programs running on a single computer may exchange information and states through shared memory. An operating system that manages the resources of a computer provides an abstraction of a process to execute a computer program. A process can be considered as an instance of a program's execution.

A process may be single-threaded or multi-threaded. A single threaded process has only one line of execution whereas a multi-threaded process is one that has several parallel lines of execution (threads) that share a single address space. Threads in a multi-threaded process coordinate with one another to accomplish a task. Some or all multi-threaded processes in an application could employ different threading models. Management of shared resources and task scheduling differs within different threading model environments. For example, in one threading model, the threads could be user threads and in another model the threads could be kernel threads (also called lightweight processes). The major difference between the two models is that the operating system is not aware of user space threads whereas it is aware of the kernel threads and hence can schedule such threads. Another example could be that in one model threads could be non-preemptible whereas they could be preemptible in another. Consider two application processes built on heterogeneous threading models that may need to dispatch and coordinate tasks with one another. This requires a much more complex way of coordinating tasks and state among these processes than the one using a homogeneous threading model. Therefore, there is a need for a method and system for scheduling and coordinating tasks between threads that use multiple processes employing heterogeneous threading models.

SUMMARY OF THE INVENTION

This invention concerns a method to schedule and coordinate tasks across processes of an application where the processes use different threading models. Briefly, according to the invention a method for scheduling and coordinating tasks between a master application process and a slave application process. The method comprises receiving a request from an application process; determining whether the request includes an embedded subtask; extracting the subtask, and sending the subtask over shared memory space for retrieval by the slave application process, if the request includes an embedded subtask, then waiting for a response for that subtask from the slave application process.

BRIEF DESCRIPTION OF THE DRAWINGS

FIG. 2A is a block diagram illustrating a bookkeeping aspect of the embodiment of the invention.

FIG. 2B shows the format of a mailbox used in an embodiment of the invention.

DETAILED DESCRIPTION OF AN ILLUSTRATIVE EMBODIMENT

Figure 1:
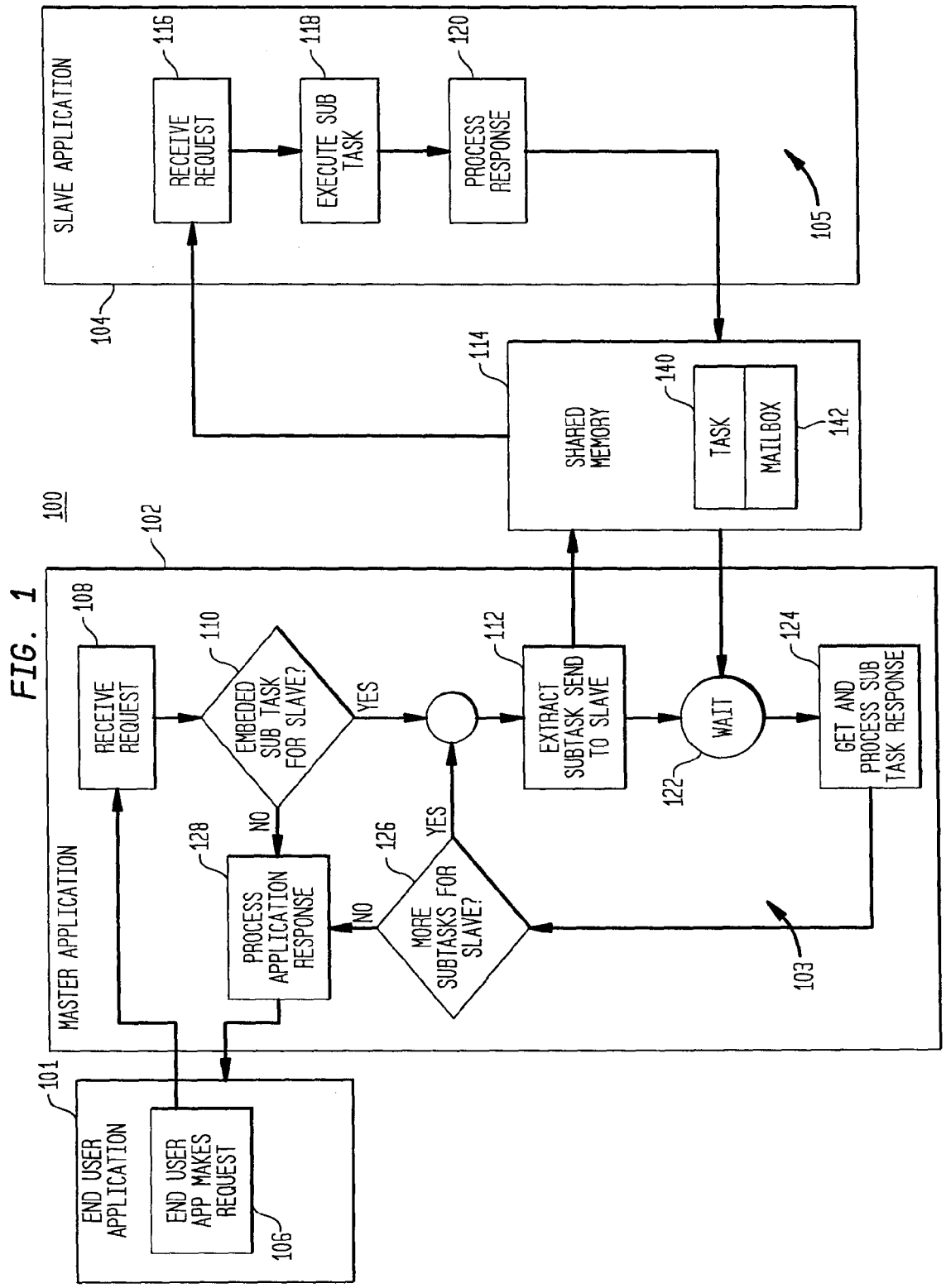
FIG. 1 is a flowchart illustrating a method for scheduling and coordinating tasks according to an embodiment of the invention.

Referring to FIG. 1, there is shown a flow diagram 100 showing a high level view of flow of control for task execution between master 102 and slave 104 applications. An end user application 101 originates a task by making a request in step 106. The master application 102 executes a master application thread 103 and the slave application 104 executes a slave worker thread 105. The process that dispatches tasks to the other process will henceforth be known as the master process and the process that executes tasks on behalf of the master process shall be henceforth known as the slave process.

Communications between end user application 101 and master application 102 are preferably standard client/server communications. Communications between master application 102 and slave application 104 are preferably task layer communications. Communication between the master 102 and slave 104 applications is done over a shared memory 114. Shared memory 114, a memory that is accessible by various coordinating processes, is the fastest medium for communication between two processes on the same machine. Shared memory is memory that is read/write accessible by various coordinating processes. The master and slave processes may pass messages to one another by writing and reading to this shared memory 114. A method according to the invention details task coordination between such heterogeneous processes over shared memory 114.

It should be noted that this model for heterogeneous threading processes will also include the slave application 104 eagerly picking up subtasks, processing a subtask specific to an application and returning a response to the master application process 102.

In step 106 the end user application 101 makes a request to the master application 102 for task execution. In step 108, the master application 102 receives this request and in step 110 it determines whether the request has a sub-task embedded for the slave application 104. If there is a sub-task embedded for the slave application 104 then in step 112 the master application 102 extracts the sub-task and dispatches it to the slave application 104 for execution. In step 122 the master application 102 then waits for a response from the slave application 104.

Meanwhile, in step 116, the slave process receives the request from the master application 102, and in step 118 it executes the sub-task. Then, in step 120 the slave application 104 processes and returns a response to the master application 102.

After receiving the response from the slave application 104, in step 124 the master application 102 processes the response, and, in decision 126, it determines whether there are more subtasks for execution by the slave application 104. If there are more subtasks the master application 102 repeats the cycle of dispatching tasks to the slave application 104. If there are no more sub-tasks for slave application 104 then in step 128 the master application 102 finishes processing the received request and sends a response to the end user application 101.

The steps of the master application 102 for dispatching tasks to the slave application 104 and waiting for a slave response and, similarly, the steps on the slave application 104 for receiving requests from master application 102 and sending a response are built using two layers in shared memory 114. These are called the task 140 and mailbox 142 layers. The two application processes attach themselves to an area in shared memory 114 that is accessible to both the slave and master processes. The two layers use this shared memory area 114 for passing information across the two application processes. The task layer 140 is the upper layer that provides the abstraction of a task and is used by the master 102 and slave 104 applications to dispatch and receive a task or task response. The task layer 140 provides the facilities of task-put and task-get operations for both the master 102 and slave 104 applications. The master thread 103 uses the task-put operation to dispatch the task for slave execution and then in step 122 blocks waiting time for a response in the task-get operation. Special threads in the slave process, known as worker threads, eternally wait for tasks in the task-get operation. These threads return from the task-get operation when they receive a task. Then they execute the task and return the response to the master application 102 using the task-put operation. In essence, the task layer 140 provides a half-duplex request-response type messaging system in which a thread in one process makes a request for a task to be performed by a thread in the other process and then waits for a response. The task layer 140 will use a lower layer called the mailbox layer 142 to accomplish the task dispatch and completion. The mailbox layer 142 provides facilities for the MailboxPut and MailboxGet operations. The mailbox layer 142 also provides the abstraction of a mailbox, which can hold a mail request from a peer. The MailboxPut operation places the mail in the mailbox of the peer slave or master thread 103. The MailboxGet operation returns a task from the mailbox to the calling thread. The Mailbox layer also defines and uses thread model-specific park and unpark operations. A park operation is used for the thread to block waiting time for a message from the peer. An unpark operation is used to wake up the peer after putting mail in its mailbox. Note that the mailboxes, task requests, and other data structures in these two layers are allocated from the shared memory area 114 and are hence accessible to both application processes.

The task layer 140 provides an application-programming interface (API) to two application processes to dispatch and execute tasks. The API for the task layer 140 consists mainly of four operations: (1) MasterPutTask, (2) MasterGetTask, (3) SlaveGetTask, and (4) SlavePutTask. The MasterPutTask and MasterGetTask operations are invoked in the context of the master thread 103 whereas the slave worker threads 105 invoke the SlaveGetTask and SlavePutTask operations.

Referring to FIG. 2A, there is shown a block diagram 200 representing all the bookkeeping information in the task layer 140. The Master Application Record 202 is the master anchor record that can be used to access various resources needed in the task layer 140. These resources are accessed as indicated by the arrows connecting the blocks 204-218 to the Master Application Record 202.

The Free List Task Request Record 204 is the free list for task request records from which master application 102 can allocate request records for dispatching. The Idle Slave Worker Record List 206 includes slave worker threads that are idle (i.e. not executing a task). The Slave Application Record 208 is the slave anchor record that can be used to access various resources in the slave application 104. The Task Request Record 210, in the master thread 103, allocates a request record to encapsulate a task to be dispatched for execution by slave worker threads. The Slave Worker Record 216 represents a slave worker thread 105. The slave worker threads are special threads that are created in the slave application process at the startup time. The only job of these worker threads is to wait for task execution requests from the master 102, execute these tasks, and return the result to the master 102. In the steady state these threads will be blocked in a SlaveGetTask operation. There are two lists for the slave worker threads, idle 206 and active 214 slave worker record lists.

The Active Slave Worker Record List 214 includes Slave worker threads 105 that are executing a task on the active list.

The Task Response Mailbox 212 is the mailbox on which the master application 102 waits for a response from the slave application 104.

The Slave mailbox 218 is the mailbox in which a slave receives task requests from the Master Application 102.

The Runnable Task Request Record List 207 is the list of the task request records that are ready for processing on the slave application 104.

The application process (master) 102 initiating a task execution request will use the operation MasterPutTask in the context of a thread 103 to dispatch the task to the slave application 104.

Referring to FIG. 2B, the contents of a general mailbox 220 include: a lock 222 for guarding the mailbox; a state word 224 describing the state of the mailbox; a task command message word 226 describing the type of task; a message pointer 228 pointing to the message in shared memory; and a thread specific park handle 230 used for blocking and unblocking a thread (the park and unpark operations).

Figure 3:
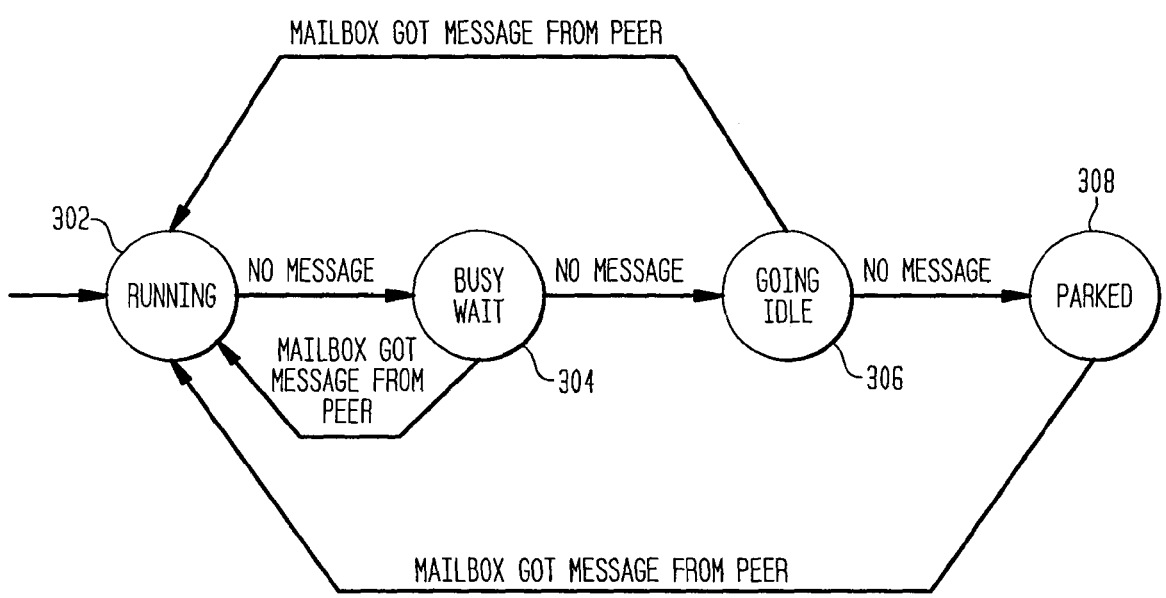
FIG. 3 is a state flow diagram illustrating a slave or master thread state transition when waiting for a task message in the mailbox.

Referring to FIG. 3, the mailbox 220 goes through several states while waiting for a task message as described by the state word 224 in the mailbox 220. FIG. 3 describes the state transition for the mailbox 220. When a thread makes a call to get a message from the mailbox 220, the mailbox 220 is in running state 302. If there is a message in the mailbox 220 then the thread returns, else it transitions to busy wait state 304. In this state it continues looping and checking for message arrival. A busy wait state consumes CPU (central processing unit) cycles and lasts for a certain number of loops. If no message arrives during that time, then the state transitions to a going idle state 306 and eventually to a parked state 308. In the parked state, the thread gets blocked and does not consume CPU cycles while waiting for the peer response. To unblock the thread, an unpark operation needs to be performed on the mailbox 220. When a peer puts the message in the mailbox 220 it may deliver an unpark operation waking the thread from parked state. After waking up, this thread checks for a message. If there is a message in the mailbox 220 then the mailbox transitions back to running state 302 and the cycle repeats.

The Mailbox layer 142 provides an API for MailboxPut and MailboxGet. Application threads use MailboxGet for retrieving messages from their own mailbox 220. MailboxGet is a blocking operation (i.e. the calling thread may get blocked waiting for messages when the mailbox 220 is empty).

Figure 4:
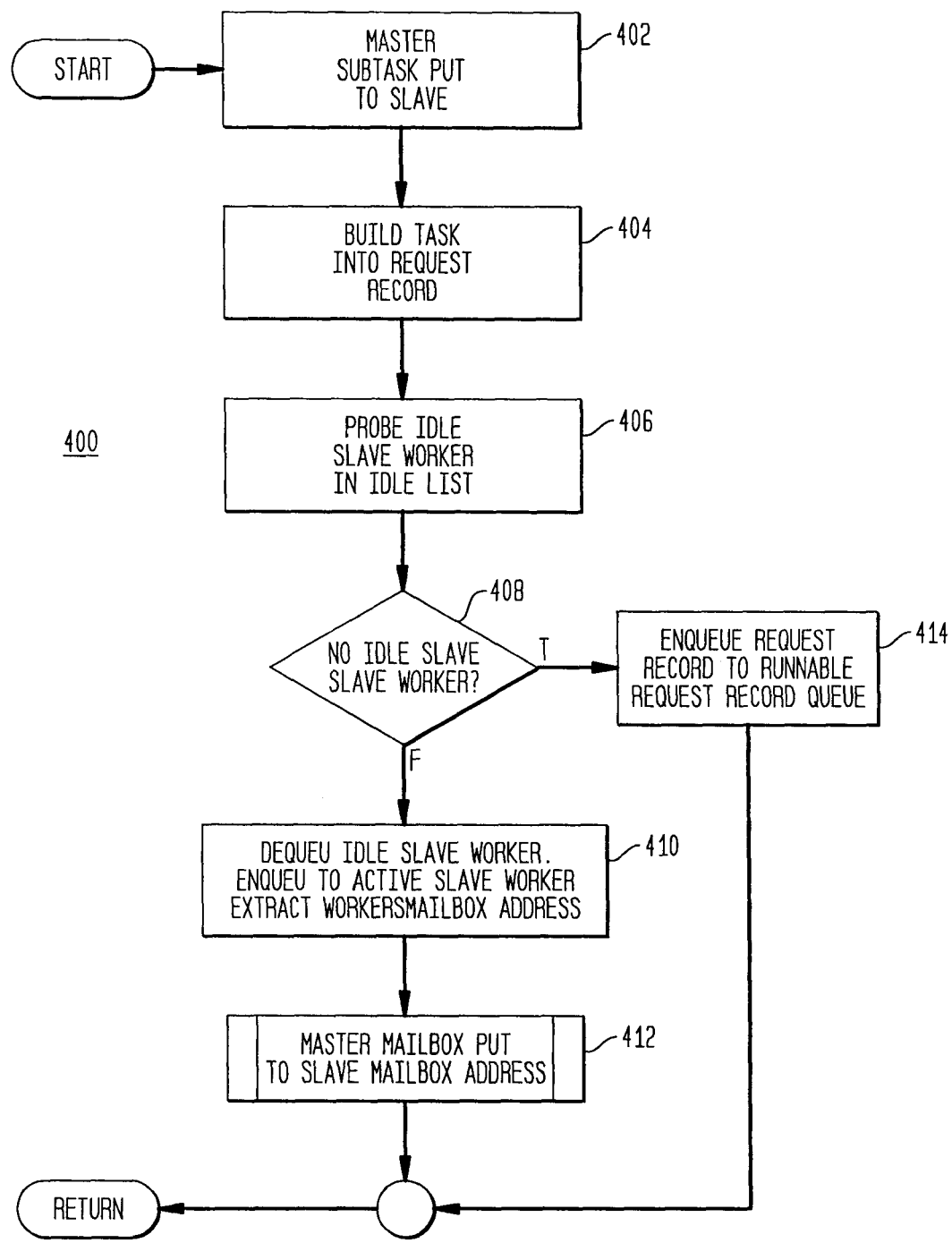
FIG. 4 is a flowchart illustrating a master task put operation.

FIG. 4 describes the flow of execution within the MasterPutTask operation. The process begins with step 402 wherein a master subtask is put (transmitted) to the slave application process 104. Next, in step 404, inside the MasterPutTask operation, a request record is allocated and the master process builds a task into this request record. In step 406 the idle slave worker record list 206 is probed, checking for availability of workers. A determination must be made in step 408 if there are no idle slave workers. If there are idle slave workers available, then in step 410 the worker is removed from an idle list 206 and put in the active workers list 214. Also the workers' mailbox address is extracted and mail is put into the mailbox 220. Next, in step 412, there is performed a master mailbox put to the slave mailbox address. The Master thread, after dispatching the task using MasterPutTask, waits for the result of the task using MasterGetTask, described in FIG. 5. If, however, it is determined in step 408 that there are no idle workers available, in step 414 the request record is put into the list of runnable requests list 207 and the MasterPutTask operation returns.

Figure 5:
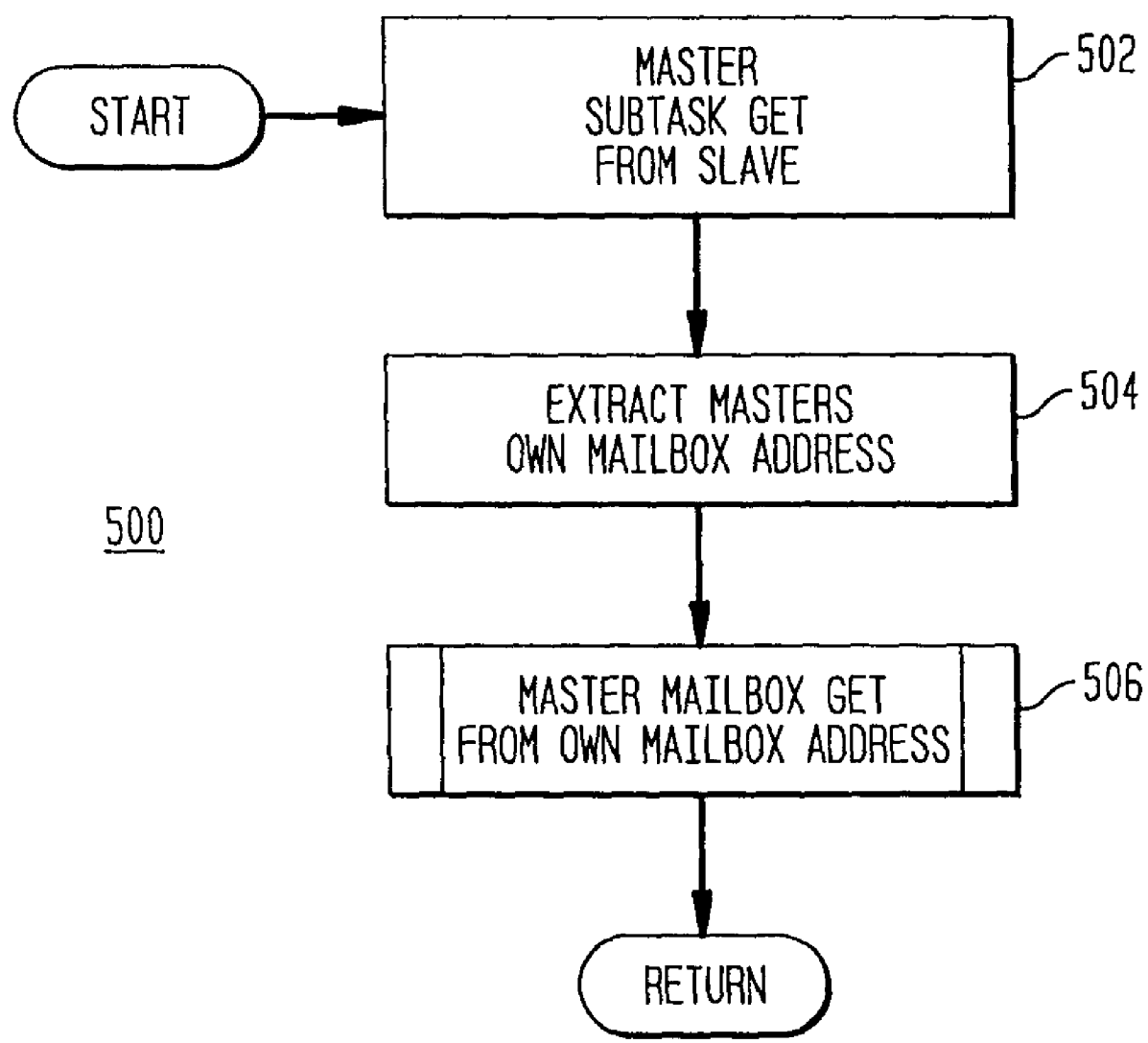
FIG. 5 is a flowchart illustrating a master task get operation.

FIG. 5 shows the MasterGetTask operation 500. Inside this operation a master thread extracts its mailbox address and waits for its mail using the MailboxGet operation. In step 502 the system performs a master-subtask-get operation from the slave 104. Then in step 504, the system extracts the master's own mailbox address, and in step 506, the master process gets a task from its mailbox address using a MailboxGet operation and the process returns.

Figure 6:
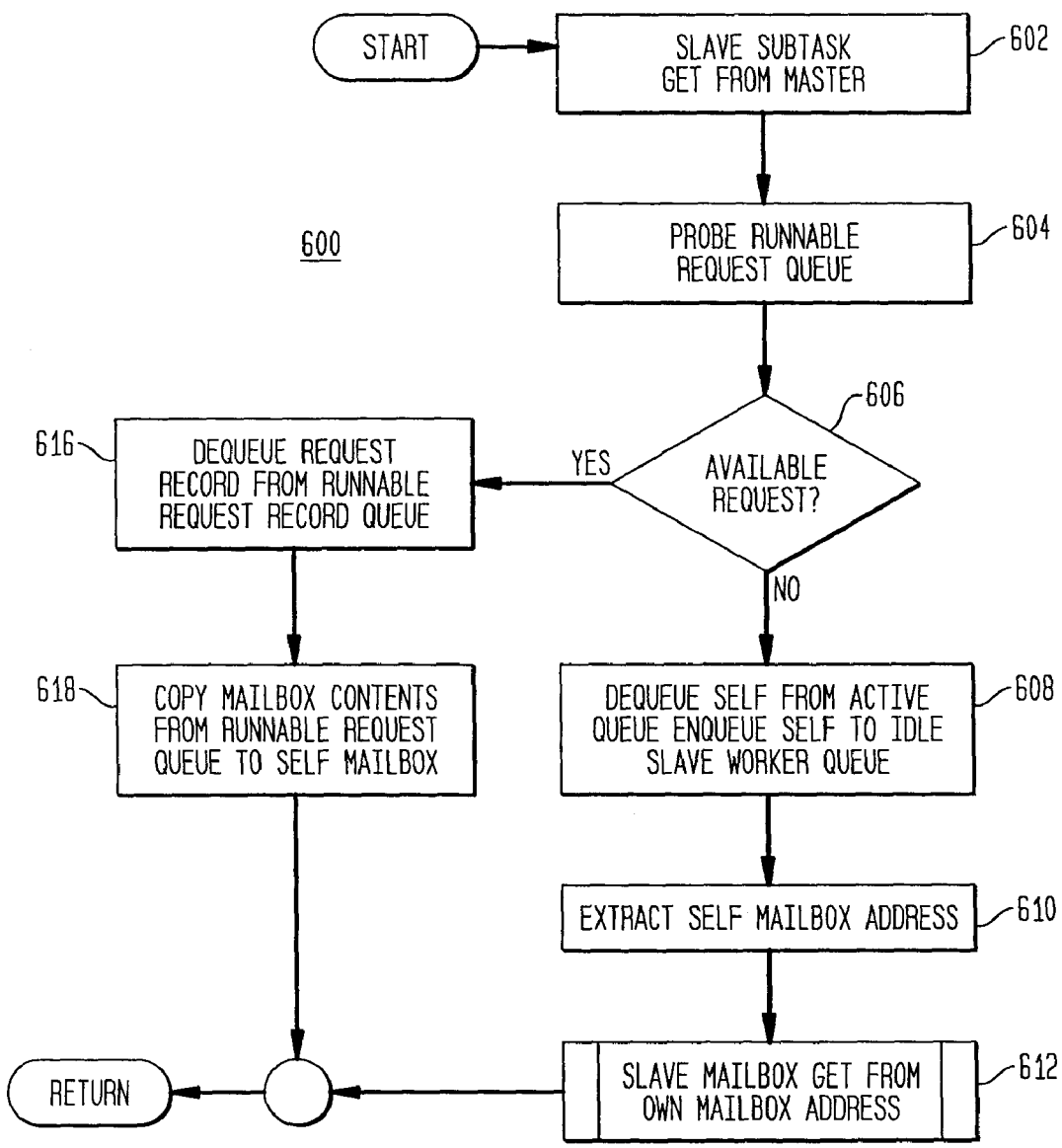
FIG. 6 is a flowchart illustrating a slave task get operation.

The slave worker threads call a SlaveGetTask operation in the steady state. FIG. 6 shows a flow chart for a SlaveGetTask operation 600. In step 602 the slave thread 105 receives a subtask from the master thread 103. Then in step 604 a slave worker thread first probes the runnable request list 207 and in decision 606 determines if there are any pending requests to be serviced. If there are pending requests, then in step 616 the request is removed (dequeued) from the runnable request record 207 and in step 618 the request is copied from the runnable request queue 207 into its own mailbox and returns from the SlaveGetTask operation.

If decision 606 determines that there are no pending requests, then in step 608 the worker removes itself from active slave worker list 214 and puts itself into the idle slave worker list 206. Then in step 610 it extracts itself from its mailbox address and waits on its own mailbox using the MailboxGet operation. Then in step 612 the slave thread 105 gets the request from its own mailbox address and the process returns.

Figure 7:
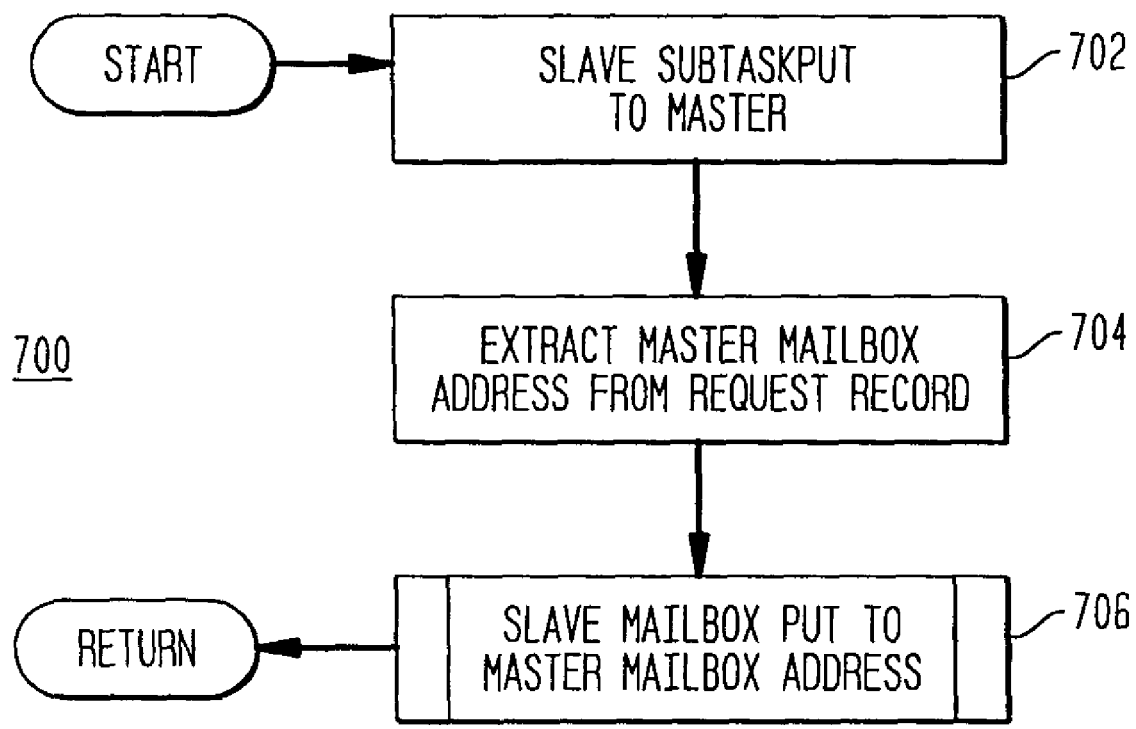
FIG. 7 is a flowchart illustrating a slave task put operation.

Referring to FIG. 7, a slave worker, after executing a task returned from a SlaveGetTask operation 600, will return the result through a SlavePutTask operation 700. In step 702 the slave thread 105 performs a SlaveSubtaskPut operation to the master thread 103. Then in step 704 a slave worker extracts the master mailbox address from the request record and, in step 706, it puts the response in the master thread's mailbox using the MailboxPut operation. The process then returns.

The Mailbox layer 142 provides the abstraction of a mailbox in shared memory 114 that is used by the task layer 140 to pass messages across heterogeneous application processes.

Figure 8:
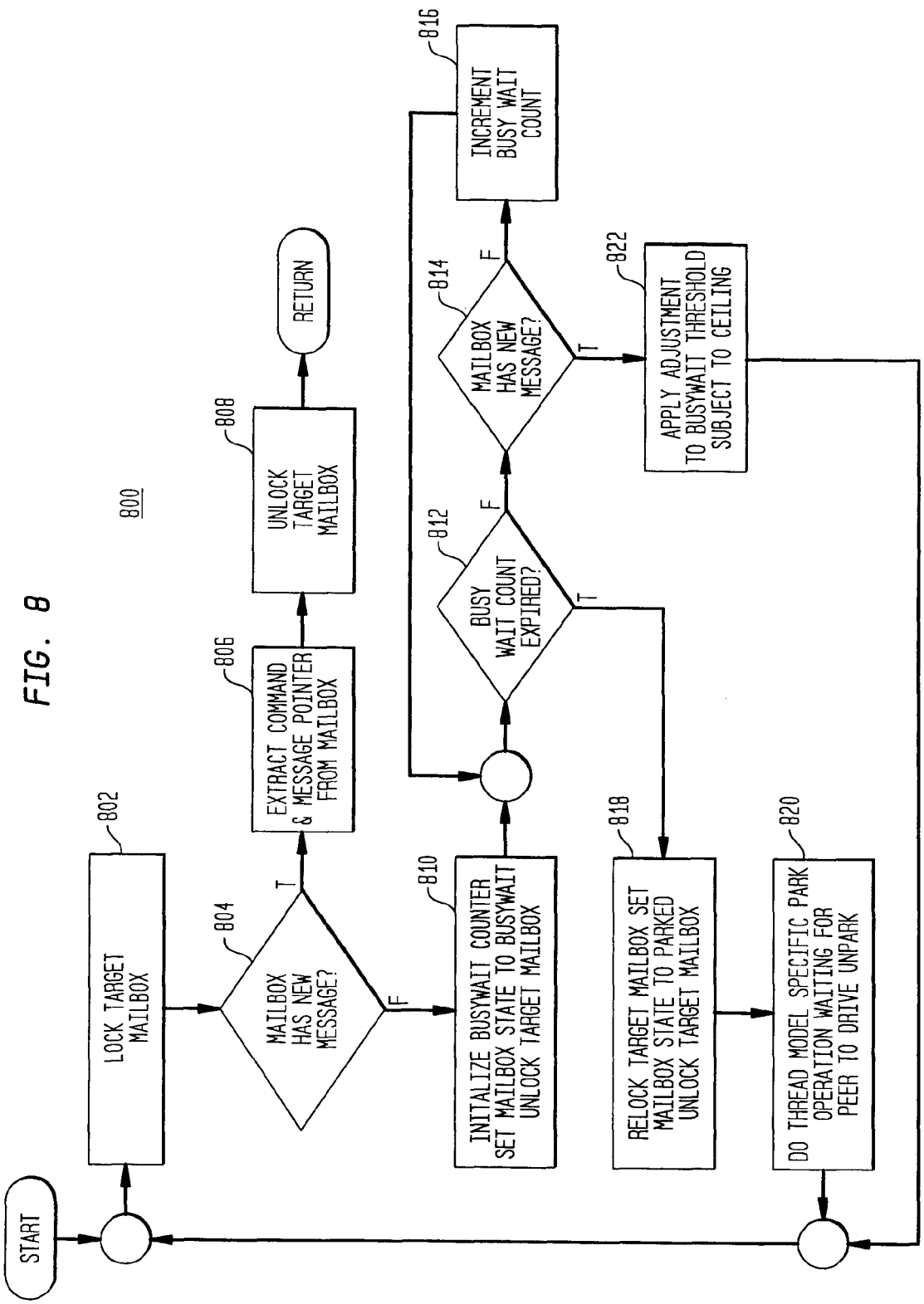
FIG. 8 is a flowchart illustrating a mailbox get operation.

FIG. 8 describes a flow of control chart for the operation MailboxGet. The first step 802 is to lock the target mailbox 220 to provide mutual exclusion from threads putting messages in the mailbox 220. Then in decision 804 it is determined whether the mailbox has a new message. If there is a message in the mailbox then step 806 extracts the task command and the message pointer, step 808 unlocks the mailbox and returns from MailboxGet.

If decision 804 determines that the mailbox does not have a new message, in step 810 a busy wait counter is initialized, the mailbox state is set to busy wait, and the target mailbox is unlocked. After that busy wait, in decision 812 a counter is examined in a loop. While the busy wait does not expire, in step 814 the mailbox is checked for new messages. If a message is received during busy wait then in step 822 the busy wait threshold is adjusted subject to a ceiling. If no message arrives during busy wait, the busy wait count is incremented in step 816. After the wait count has expired, then in step 818 the target mailbox is relocked, the mailbox state is set to parked state and the target mailbox is then unlocked. Then a thread model specific park operation is performed in step 820 and the thread comes out of this operation only when the peer does an unpark operation. After coming out of the park operation the entire cycle repeats again.

The MailboxPut operation is used for putting messages into the mailbox of the peer application thread. MailboxPut is a non-blocking operation (i.e. threads calling MailboxPut will not block or wait).

Figure 9:
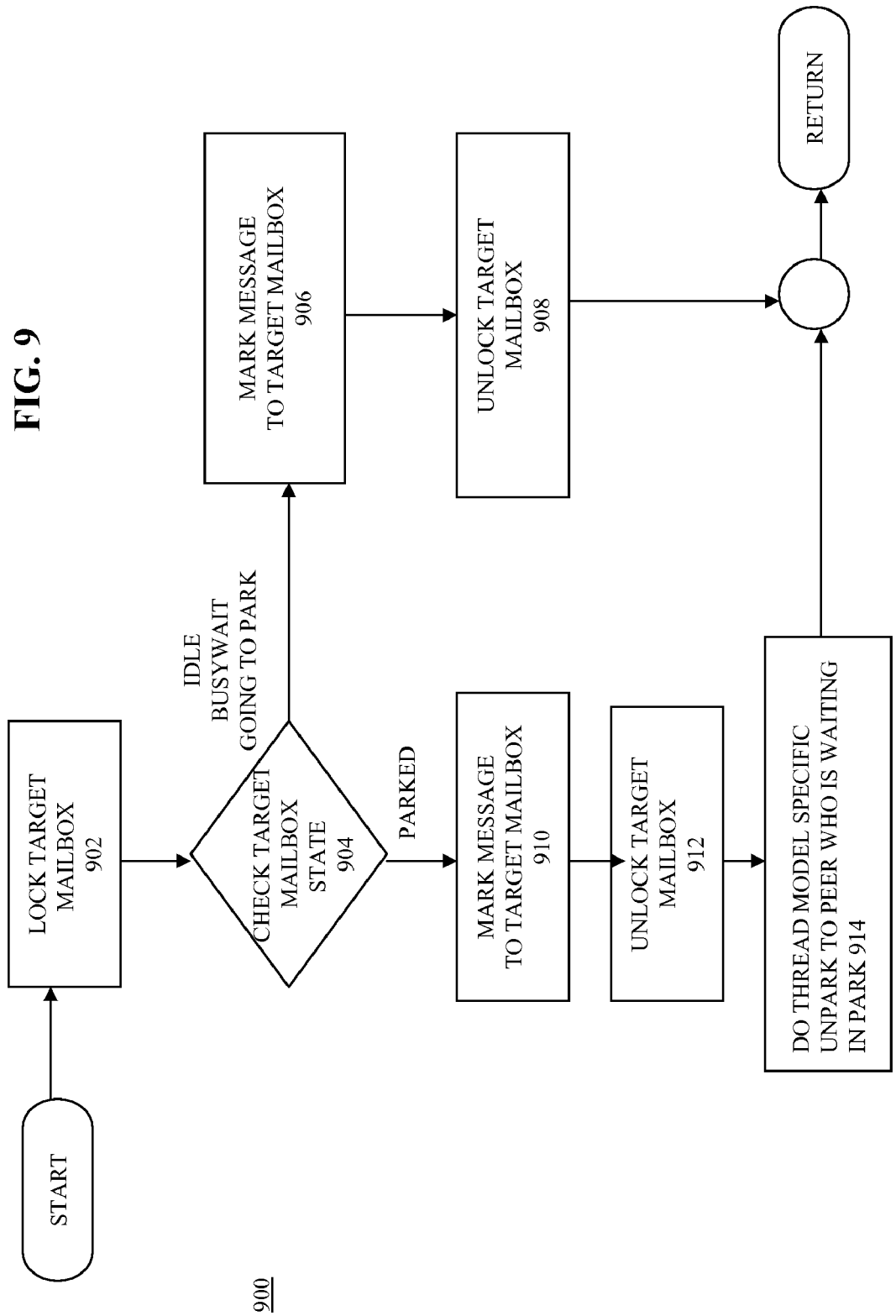
FIG. 9 is a flowchart illustrating a mailbox put operation.

FIG. 9 describes the MailboxPut operation. First, in step 902 the mailbox 220 is locked for mutual exclusion. Then, in decision 904 the state is checked to determine whether the mailbox 220 is in a parked state. If it is not in the parked state, then in step 906 the task command and message pointer are marked in the mailbox and the mailbox is unlocked in step 908. Else, if the mailbox is in the parked state then in addition to marking the message to the target mailbox in step 910 and unlocking the mailbox in step 912, an unpark operation is also performed in step 914. The unpark operation is specific to the thread model of the peer that is waiting in the park operation. After this step, the MailboxPut operation is complete and the process returns.

Figure 10:
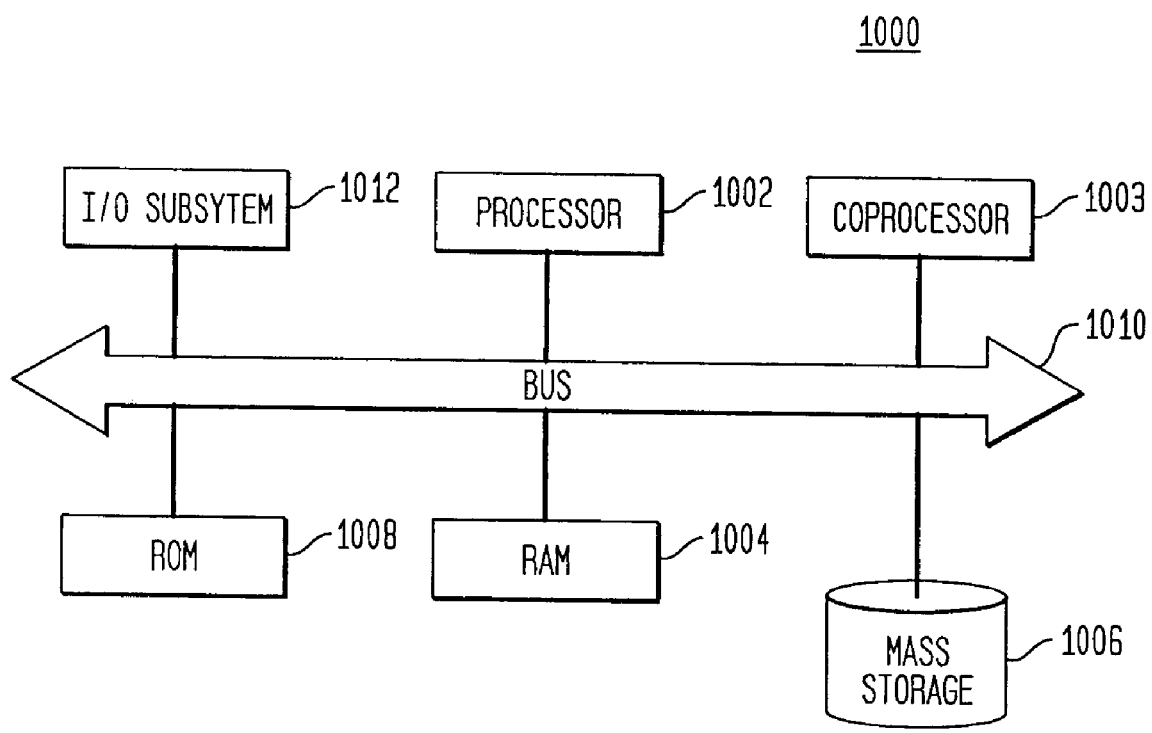
FIG. 10 is a block diagram of an information processing system that may be configured to operate according to an embodiment of the invention.

Referring to FIG. 10, there is shown a simplified block diagram of an information processing system 1000 that may be configured to operate according to an embodiment of the invention. The system 1000 comprises a processor 1002 and a coprocessor 1003 both coupled to system operating memory (e.g., random-access memory, RAM) 1004, mass storage 1006, and ROM 1008 all connected via a system bus 1010. The system also comprises an I/O subsystem 1012 that may include peripherals such as a keyboard, display, pointing device, and one or more drives for removable computerusable media such as a CDROM. The system 1000 is configured for scheduling and coordinating tasks between a master application 102 and a slave application 104. The master and slave applications as well as an end user application 101 can be stored in mass storage 1006. When the system 1000 is used according to the invention the applications (or parts thereof) are loaded in memory 1004 for processing by processor 1002. A part of the memory 1004 is shared between the master application 102 and a slave application 104 for receiving tasks from the master application 102 for processing by the slave application 104. The processor 1002 is programmed to send the tasks received from the application to the shared memory 114, to retrieve the tasks by the slave application 104, process the tasks by the slave application 104 and send the response to the task from the slave application 104 to the shared memory 114 for retrieval by the master application 102. The master application 102 then provides the results to the user application 101. The invention may also be implemented as a program product with machine-usable instructions for implementing the methods discussed herein and stored in removable storage media such as Compact Discs or DVDs.

Therefore, while there has been described what is presently considered to be the preferred embodiment or embodiments, it will be understood by those skilled in the art that other modifications can be made within the spirit and scope of the invention.

We claim:

1. A method for retrieving tasks by a slave application in a system for scheduling and coordinating tasks between a master application and the slave application, the method comprising:
   determining whether a portion of a memory shared with the master application, designated as a mailbox, has a message including a task to be performed by the slave application, wherein the master application and the slave application using threads to access to the mailbox;
   retrieving the message when it is present in the mailbox;
   processing the task to be performed; and
   sending a response to the task to the mailbox for retrieval by the master application,
   wherein the determining whether the mailbox has a message further includes:
     locking the mailbox, to provide mutual exclusion from threads putting messages in the mailbox;
     determining whether the mailbox has a new message;
     if there is a new message in the mail box,
       extracting a task associated with the message, and
       unlocking the mailbox;
     if there is no new message in the mailbox,
       setting a busy wait counter,
       setting the mailbox state to busy wait state, wherein the mail box is in the busy wait state a thread continues looping and checking for message arrival until the busy wait counter reaches a threshold, and
       unlock the mailbox.

2. The method of claim 1 further comprising:
   examining a counter in a loop while the busy wait counter does not expire; and
   checking the mailbox for new messages.

3. The method of claim 2 further comprising:
   if the new message is received during busy wait state, adjusting the busy wait counter threshold to a ceiling.

4. The method of claim 2 wherein if no message arrives during the busy wait state then the method further comprises:
   relocking the mailbox;
   setting the mailbox state to parked state; and
   unlocking the mailbox.

5. The method of claim 1 further comprising:
   performing a thread model specific park operation wherein a thread comes out of this operation only when a peer does an unpark operation.

6. An information processing system for scheduling and coordinating tasks between a master application and a slave application, the system comprising:
   a memory shared between the master application and a slave application for receiving messages including tasks from the master application for processing by the slave application, wherein the shared memory having a portion designated as a mailbox for receiving the messages, wherein the master application and the slave application using threads to access to the mailbox; and
   processor for putting the messages to the mailbox from the master application, for retrieving the tasks by the slave application, processing the tasks by the slave application and sending the response to the tasks from the slave application to the mailbox for retrieval by the master application, wherein retrieving the tasks by the slave application includes:
     locking the mailbox, to provide mutual exclusion from threads putting messages in the mailbox,
     determining whether the mailbox has a new message;
     if there is a new message in the mailbox,
       extracting a task associated with the message, and
       unlocking the mailbox;
     if there is no new message in the mailbox,
       setting a busy wait counter,
       setting the mailbox state to busy wait state, wherein the mailbox is in the busy wait state a thread continues looping and checking for message arrival until the busy wait counter reaches a threshold, and
       unlock the mailbox.

* * * * *